(12) United States Patent
Whitfield et al.

(10) Patent No.: US 9,934,544 B1
(45) Date of Patent: *Apr. 3, 2018

(54) SECURE CONSENT MANAGEMENT SYSTEM

(71) Applicant: CADG Partners, LLC, Murrieta, CA (US)

(72) Inventors: Andre Dior Whitfield, Murrieta, CA (US); Kathryn M. Garvy, Murrieta, CA (US)

(73) Assignee: CADG Partners, LLC, Murrieta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,822

(22) Filed: Mar. 13, 2017

Related U.S. Application Data

(63) Continuation-in-part of application No. 14/710,489, filed on May 12, 2015.

(51) Int. Cl.
  *G06Q 50/26* (2012.01)
  *H04L 29/06* (2006.01)
  *G06Q 50/00* (2012.01)

(52) U.S. Cl.
  CPC ........... *G06Q 50/265* (2013.01); *G06Q 50/01* (2013.01); *H04L 63/083* (2013.01); *H04L 63/0861* (2013.01); *H04L 63/102* (2013.01)

(58) Field of Classification Search
  CPC .. G06Q 30/06; G06Q 30/0601; H04L 63/102; H04L 63/083; H04L 63/0861
  See application file for complete search history.

(56) References Cited

U.S. PATENT DOCUMENTS

| | | | | |
|---|---|---|---|---|
| 7,280,975 | B1* | 10/2007 | Donner | G06Q 10/02 235/382 |
| 2002/0029171 | A1* | 3/2002 | Senior | G06Q 30/02 705/413 |
| 2003/0161505 | A1* | 8/2003 | Schrank | G06K 9/00288 382/118 |
| 2008/0033882 | A1* | 2/2008 | Kafkarkou | G06F 8/61 705/52 |
| 2008/0119195 | A1* | 5/2008 | Hansson | H04M 3/4234 455/445 |

(Continued)

*Primary Examiner* — Mahfuzur Rahman
*Assistant Examiner* — Arya Golriz
(74) *Attorney, Agent, or Firm* — Knobbe, Martens, Olson & Bear LLP

(57) ABSTRACT

Features are disclosed relating to a network-based consent management system that securely manages various aspects of consenting and agreeing to engage in physical relationships, including sexual relationships. For example, the system can manage processes such as requesting and obtaining consent, agreeing to provide consent, declining to provide consent, preemptively providing or declining consent without a consent request, verifying identities of individual users, verifying users' capacity to consent, and the like. In addition, the system can securely maintain a record of consent agreements and refusals. Thus, users of the system can initiate or otherwise participate in certain physical interactions with other users, secure in the knowledge that the participants have provided unambiguous informed consent and that a record of such consent has been created and securely stored by a third party.

18 Claims, 14 Drawing Sheets

(56) References Cited

U.S. PATENT DOCUMENTS

| | | | | |
|---|---|---|---|---|
| 2009/0210781 A1* | 8/2009 | Hagerott | ............... | G06F 9/4443 715/234 |
| 2010/0262462 A1* | 10/2010 | Tryfon | ................... | G06Q 30/02 705/7.32 |
| 2012/0117167 A1* | 5/2012 | Sadja | ................... | G06F 17/3089 709/206 |
| 2012/0158532 A1* | 6/2012 | Fitzsimmons | ......... | G06Q 30/06 705/26.1 |
| 2014/0108289 A1* | 4/2014 | Eitan | ...................... | G06Q 50/01 705/342 |
| 2015/0058026 A1* | 2/2015 | Hoeller | ................. | G06F 19/327 705/2 |

* cited by examiner

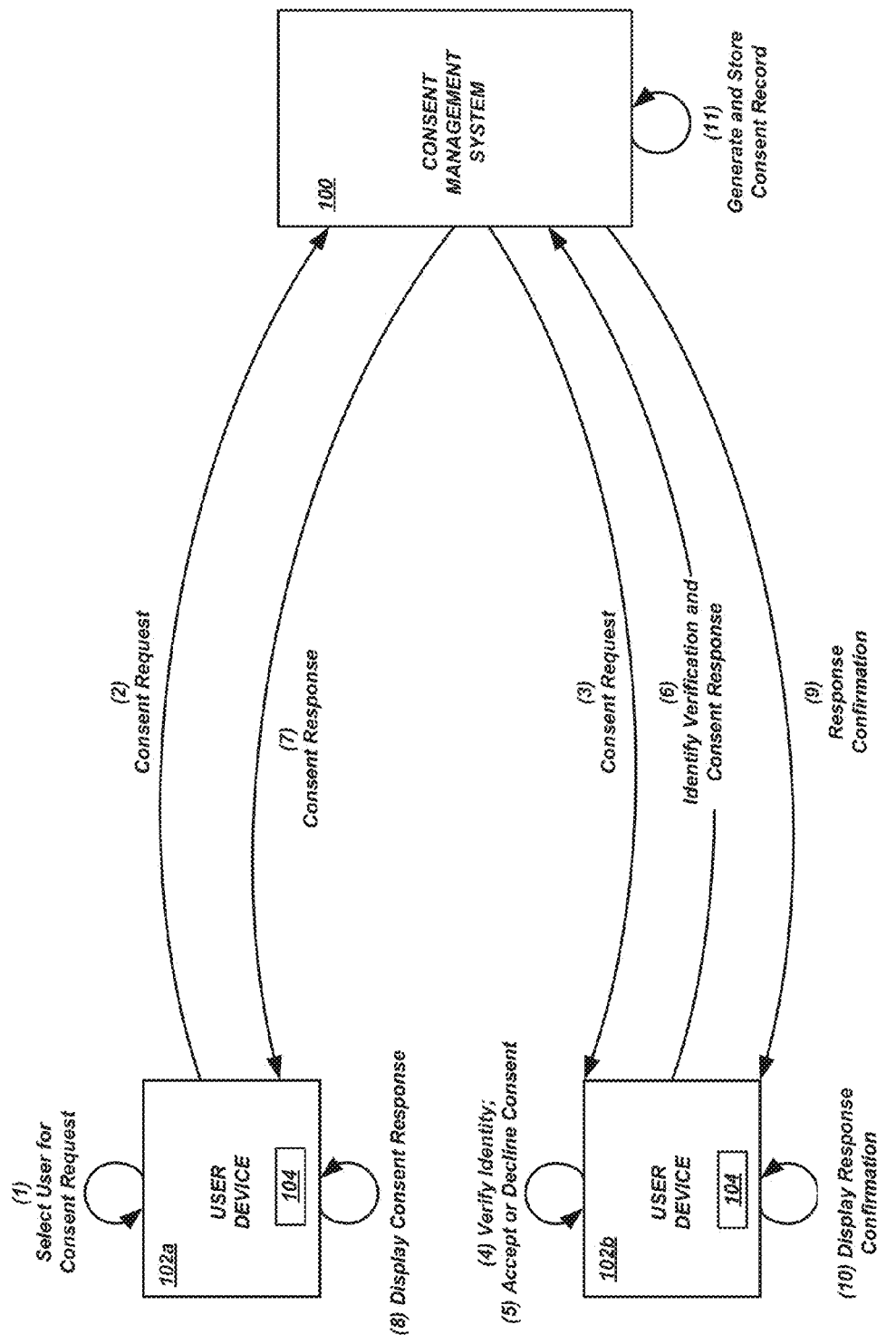

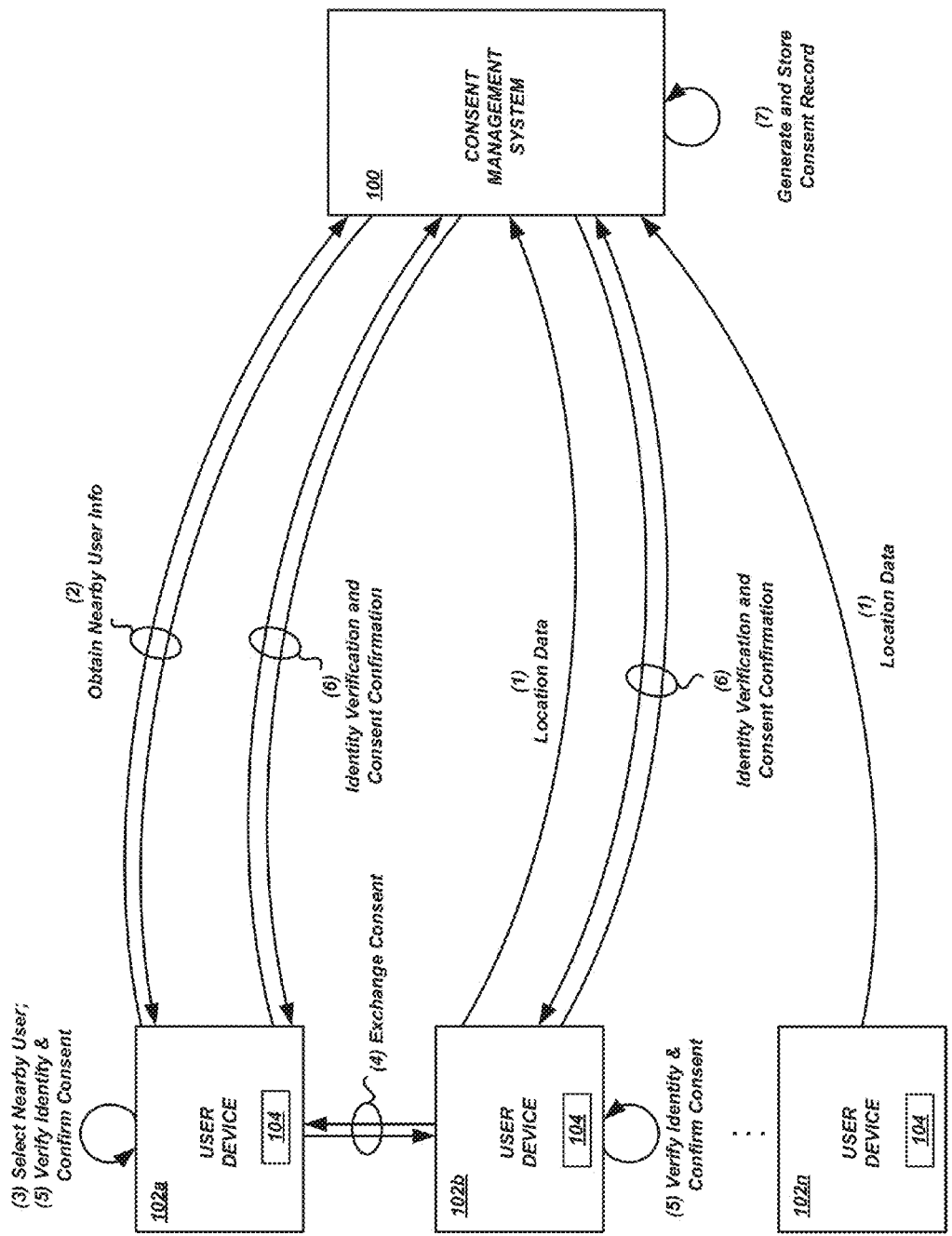

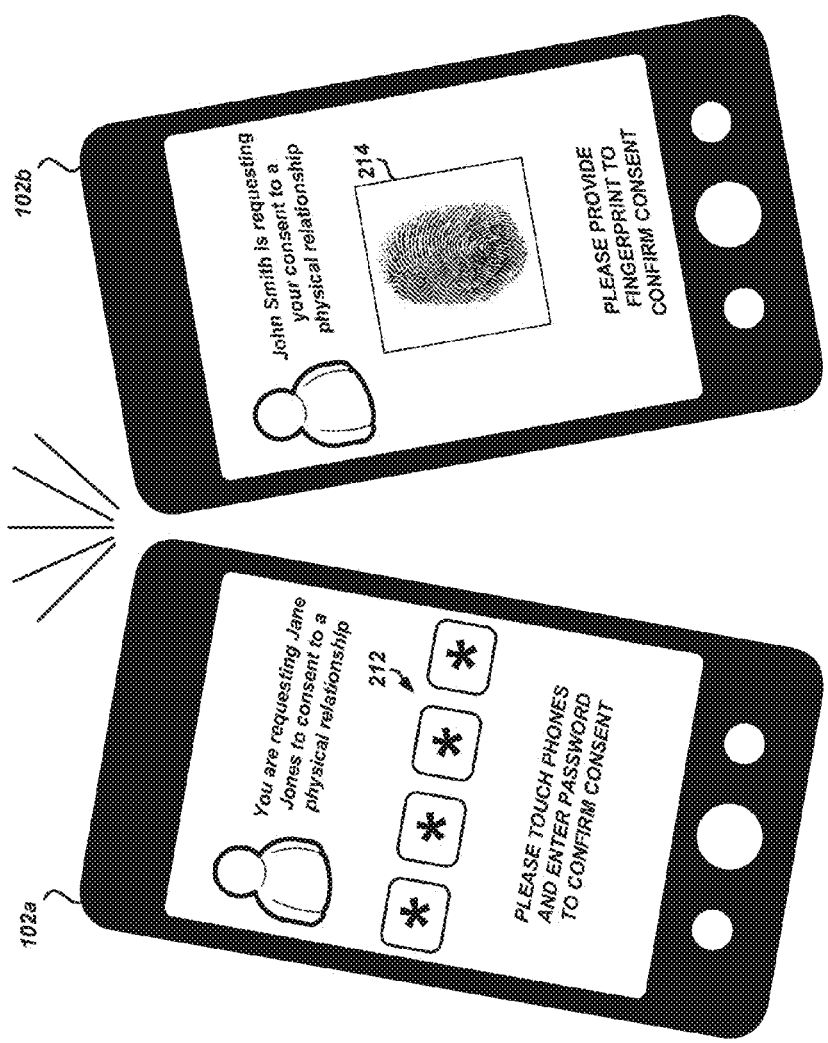

SECURE CONSENT MANAGEMENT SYSTEM

CROSS-REFERENCE TO RELATED APPLICATION

This application is a continuation-in-part of U.S. patent application Ser. No. 14/710,489, entitled SECURE CONSENT MANAGEMENT SYSTEM, and filed May 12, 2015, the entirety of which is incorporated by reference herein.

BACKGROUND

Individuals often use network-based systems such as social networks, dating websites, and applications to search for, identify, express interest in, and communicate with other individuals for the purpose of forming relationships. For example, many dating systems afford users the opportunity to develop relationships with other users prior to meeting with each other in person. Such dating systems often provide an online meeting place for like-minded users to register their personal profiles, search and view the profiles of other users, and initiate contact with other users through various communication channels such as text or voice messages, video chats, voice chats, and instant messaging. Users then decide whether to advance the relationship and meet in person or otherwise communicate outside of the dating system (e.g., via personal email, phone calls, text messages, and other electronic communication not routed through or otherwise involving the social network or dating system). Once the relationship progresses to such in-person meetings and other interactions, social networks and dating systems typically have little or no control over the interactions and do not record information about the interactions. Therefore, such social networks and dating systems are unable to facilitate or record consent and/or agreement as to the nature of in-person meetings, including consent and/or agreement regarding sexual interactions.

Some individuals use security systems, such as video and/or audio recording equipment, to record the consent and/or agreement of others related to physical relations and sexual interactions. Thus, the individuals may be protected from false accusations regarding the consensual nature of the interactions. However, such methods are often used without full disclosure to the other parties, thereby raising privacy concerns regarding the video and/or audio recordings. To ease or eliminate such concerns, some individuals use written consent documents to obtain consent from others prior to engaging in physical relation and sexual interactions. Thus, the individuals may be protected from false accusations regarding the consensual nature of the physical relationships without many of the privacy concerns associated with video and/or audio recordings.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 3 illustrates example data flows and interactions between user devices and a consent management system to request consent and respond to consent requests according to some embodiments.

FIG. 6 illustrates example data flows and interactions between user devices and a consent management system to provide consent according to some embodiments.

FIG. 7A illustrates an example exchange and confirmation of consent between two user devices according to some embodiments.

DETAILED DESCRIPTION OF ILLUSTRATIVE EMBODIMENTS

Introduction

Figure 1:
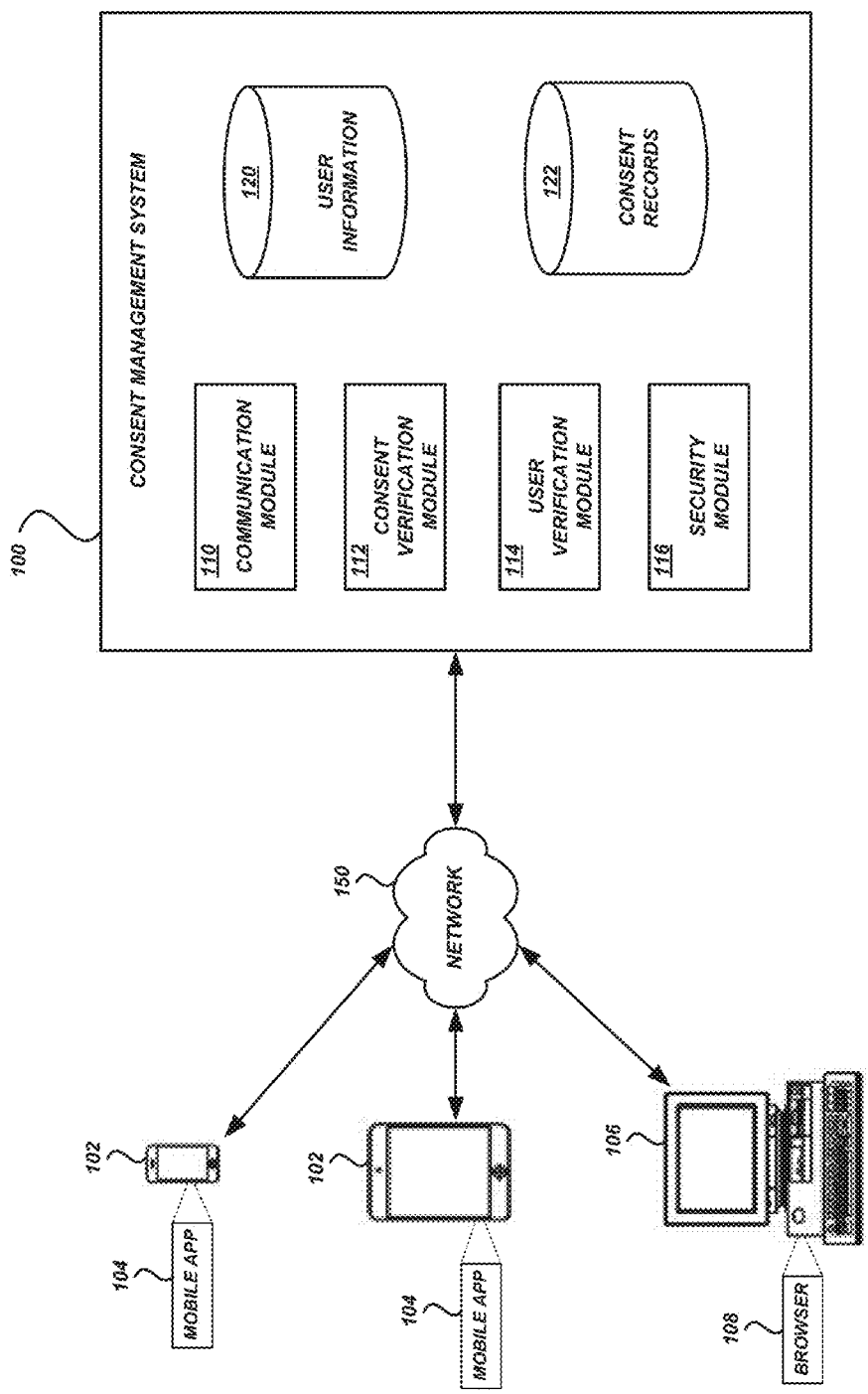
FIG. 1 illustrates a network environment with a consent management system and various user devices according to some embodiments.

The present disclosure is directed to a network-based consent management system that securely manages various aspects of consenting and agreeing to engage in physical relationships, including sexual relationships. For example, the system can manage processes such as requesting and obtaining consent, agreeing to provide consent, declining to provide consent, preemptively providing or declining consent without a consent request, verifying identities of individual users, verifying users' capacity to consent, and the like. In addition, the system can securely maintain a record of consent agreements and refusals. Thus, users of the system can initiate or otherwise participate in certain physical interactions with other users, secure in the knowledge that the participants have provided unambiguous informed consent and that a record of such consent has been created and securely stored by a third party.

Conventionally, when deciding to initiate or engage in sexual activity with another party, an individual may rely solely on the verbal consent of the other party, non-verbal cues from the other party, or even the other party's lack of refusal to consent. However, without a record of the other party's consent, individuals sometimes face false accusations regarding the nature of the consent or the refusal to consent. Additionally, relying on a mere lack of refusal to consent may be illegal or may violate certain codes of conduct (e.g., codes of conduct increasingly being implemented at universities). Audio and/or video recordings of verbal consent or non-verbal consent (e.g., active participation or initiation by the other party) may be used to prove consent, but such recordings may raise privacy concerns and may be illegal if the consenting party does not know that he/she is being recorded. Pre-drafted consent documents may be used to obtain written consent from another party prior to engaging in sexual interactions, but such documents may be altered after being signed, the signature may be forged, or the execution of such written agreements may not be practical. Moreover, many of the aforementioned conventional methods fail to provide proof that a party has declined to consent and is making credible accusations and claims.

Aspects of the present disclosure relate to using personal mobile electronic devices (e.g., cellular phones or "smart phones") to request and obtain the consent of parties to engage in physical relations such as sexual activities. A record of the consent request and agreement may then be stored at a separate network-accessible system such that the record is available to users for viewing but is not alterable by the users. In some embodiments, users of the system can set up profiles, acknowledge and agree to the terms of use for the system (e.g., confirm understanding of the nature of physical relations such as sexual activity and the agreement to engage in such activity, agree to maintain the privacy of other users, etc.), and the like. Such tasks may be completed at application installation, account signup, or during some other initialization period. Then, when consent to engage in sexual relationships is desired by or from another user of the system, such consent may be provided at the touch of a button or in response to some other interaction with a mobile electronic device, without the need for reviewing and executing lengthy written legal documents each time. In response, a record of the consent request and response can be created and securely stored at a network-accessible server, and the affected users can be notified of the response. Thus, the affected users each have unambiguous notification and confirmation of the consent agreement or refusal to consent. In addition, the users may access the secure record of the consent or refusal at a later time, such as when proof of consent or refusal is needed to support or refute claims to contrary. In some embodiments, the secure record may be stored in encrypted form such that system administrators, other users, or any other party is unable to access it without the participation of at least one of the affected users (e.g., a separate copy of the record may be maintained for each user, and the individual copies may be encrypted using a key provided by or otherwise associated with a corresponding user and may therefore only be decrypted using the key of the corresponding user).

Additional aspects of the disclosure relate to user identity verification during the consent request and response process. To avoid the forgery and alteration problems raised by using written consent agreements, users may be required to provide passwords, biometric information, or other security information at the time consent is requested, provided, and/or refused. For example, during the account or profile set-up process or at some other time, users may provide verification information (e.g., passwords, fingerprints or other biometric information, etc.) to the consent management system, and such information may be tied to the user account or profile. Thereafter, when a user wishes to, e.g., respond to a request for consent by consenting to the requested physical relationship, the user may be prompted to provide a password or biometric information concurrently with the requested consent (e.g., immediately prior to providing consent, immediately after providing consent, etc.). In this way, the requesting user can be assured that the consent was actually provided by the party from whom it was requested, rather than someone else who may be using the party's mobile phone. In addition, users can be assured that their own consent is not falsely provided (e.g., by someone else who may be using the user's mobile phone), but instead is only provided and recorded when the security procedures are complete and the user's identity is verified.

Further aspects of the disclosure relate to refusing consent and securely storing a record of such refusal. For example, when responding to a request for consent, a user may respond at the touch of a button as described above. In case the user wishes to refuse consent, the refusal may be similarly easy (e.g., activation of a different button, selection of a different option, etc.). Notification of the refusal to consent can be provided to the use who initiated the request for consent. In some embodiments, confirmation that the requesting user has received the notification may be provided to the user who refused to consent, thus ensuring that all affected parties know the status of the request, refusal, and notification.

Still further aspects of the disclosure relate to pre-emptive notification of consent or refusal to consent. In some embodiments, a user may pre-emptively provide a notification of refusal to consent. For example, rather than wait for a consent request and be put in a position to accept or decline it, a user may pre-emptively and unambiguously notify another party (e.g., before a scheduled date) that the user does not consent to physical or sexual interaction. The notification may indicate that consent is refused either in connection with a specific date or until such time as consent is provided in the future. In this way, all affected parties may begin the date with a common understanding. In some embodiments, a user may pre-emptively provide consent without waiting for a request. For example, a first user may use the consent management system to provide a notification to a second user that the first user is consenting to a certain physical relationship. Such notification may be generated preemptively, without first requiring a request for consent from the second user.

Yet further aspects of the disclosure relate to features such as automatic determination of capacity to provide consent, customized requests for consent regarding specific types of physical sexual activity (rather than sexual activity in general), and other consent-related features. For example, an intoxication test may be provided to a user in order to determine whether the user may provide consent. The intoxication text may be based on an analysis of breath, saliva, blood, etc., as provided to the mobile device or to some device in communication with the mobile device or the consent management system. As another example, a questionnaire may be presented to the user, or the user may be required to otherwise demonstrate skills that an intoxicated person would be unable to demonstrate. In some embodiments, a user may request or provide consent for particular types of physical relations (e.g., kissing, touching) or sexual activity (e.g., oral or vaginal intercourse), rather than requesting or providing consent for sexual activity in general.

Still further aspects of the disclosure relate to providing access to the features of the consent management system to external systems through an application programming interface ("API"). In some embodiments, the consent management system may expose an API that allows external systems to utilize features of the consent management system by interacting with the API. For example, a dating system or social network may operate a server to provide dating and/or social networking features. In addition, the server may provide consent management functionality through use of the consent management system API.

Although aspects of the embodiments described in the disclosure will focus, for the purpose of illustration, on the use of mobile devices executing application software to request, provide, and refuse consent, one skilled in the art will appreciate that the features disclosed herein may be applied to any number of other devices or methods of requesting, providing, or refusing consent. For example, the features disclosed herein may be implemented by a web site or dial-in system (e.g., an automated telephone dialog service). In addition, although the term "relationship" is used herein with respect to requesting and providing consent, the term "relationship" is not meant to be limiting, and may refer to single instances of sexual interaction rather than ongoing relationships or recurring instances of sexual interactions.

Various aspects of the disclosure will now be described with regard to certain examples and embodiments, which are intended to illustrate but not limit the disclosure.

Consent Management System and Network Environment

FIG. 1 illustrates an example network environment in which features can be implemented for requesting consent to engage in physical relationships, responding to such requests, preemptively providing or refusing consent, and accessing records regarding such consent requests and notifications. The network environment can include various devices, systems, services, and the like in communication via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, etc. or combination thereof, any or all of which may or may not have access to and/or from the Internet.

As shown, the network environment can include a consent management system 100 to manage the process of requesting, providing, and recording consent or refusal to consent. In addition, the network environment can include any number of user computing devices, such as mobile user devices 102, desktop user devices 106, etc. Illustratively, a user of a mobile user device 102 may interact with a mobile consent application 104 executing on the mobile user device 102 to perform various consent request, response, and notification functions described herein. Alternatively, or in addition, a user may interact with a browser-based interface to perform the various consent request, response, and notification functions, such as content site (e.g., a "web site" with various "web pages"), a hosted application, or some other interface provided by the consent management system 100 and accessed via a browser application 108 executing on a substantially stationary user device 106.

The devices, entities, services and features described above are illustrative only, and are not intended to be limiting. Any or all of the devices, entities, services and the like described above and shown in FIG. 1 may perform fewer, additional, and/or alternative functions. In some embodiments, fewer, additional, and/or alternative devices, entities, and services may be part of or otherwise associated with a networked consent management environment. In addition, although examples and embodiments will be described herein with respect to mobile user devices 102 executing mobile consent applications 104, those of skill in the relevant art will appreciate that features may be implemented via web sites accessible via browser applications 108 executing on mobile user devices 102 or substantially stationary user devices 106. Thus, the examples and embodiments described below will refer to mobile user devices 102 and substantially stationary user devices 106 interchangeably, and will refer to them simply as "user devices" for convenience.

The network environment may include any number of distinct user devices 102. In addition, multiple (e.g., two or more) consent management systems 100 may be used. For example, separate consent management systems 100 may be located so that they are close (in either a geographical or networking sense) to groups of current or potential user devices 102. In such a configuration, a user device 102 may establish communications with the consent management system 100 to which it is closest, rather than all user devices 102 requesting consent via a single consent management system 100.

The consent management system 100 can be a physical server or group of physical servers that may be accessed via one or more networks, such as network 150. As shown, the consent management system 100 may include various modules, components, data stores, and the like to provide the consent request, response, notification, and record-keeping features described herein. For example, the consent management system 100 may include: a communication module 110 to facilitate communication between users of the consent management system 100 (e.g., hosting chat rooms or managing instant messaging conversions between users operating different user devices 102), a consent verification module 112 to relay consent requests and confirm, with the affected parties, the consent or refusal to consent; a user verification module 114 to verify user identities and ensure that the users requesting, providing, and/or refusing consent are who they claim to be; and a security module 116 to manage secure record keeping related to consent requests and other consent-related operations. In addition, the consent management system 100 may include various data stores, such as: a user information data store 120 to store information about the individual users (e.g., user profiles, information to confirm passwords, etc.); and a consent records data store 122 to store secure records of consent requests, agreements to consent, refusal to consent, and the like. In some embodiments, the consent management system 100 may include fewer, additional, and/or alternative modules, components, data stores, and the like than those illustrated in FIG. 1. For example, the consent management system 100 may include a web server that serves content and/or an interface accessible via browser applications 108.

The consent management system 100 may be a single computing device, or it may include multiple distinct computing devices, such as computer servers, logically or physically grouped together to collectively operate as a server system. The components of the consent management system 100 can each be implemented as hardware, such as a server computing device, or as a combination of hardware and software. In addition, the modules and components of the consent management system 100 can be combined on one server computing device or separated individually or into groups on several server computing devices. In some embodiments, the features and services provided by the consent management system 100 may be implemented as web services consumable via the communication network 150. In further embodiments, the consent management system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user devices 102/106 may be any of a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102/106 may execute a so-called "thick client" application and/or a "thin client" application (such as a browser application) to communicate with other computing systems, such as the consent management system 100, other user devices 102/106, etc.

Individual user devices 102 may have various modules and components that facilitate or provide the features described herein, including a display such as a video output display to provide a graphical user interface, and a consent application 104 to facilitate the various consent functions described herein. The user devices 102 may include or otherwise have access to a location module such as a global positing system ("GPS") antenna and corresponding components to determine the current geographic location of the user device 102; a messaging module to receive notifications from the consent management system 100, communicate with other users, and the like; a graphical user interface ("GUI") module to generate and manage user interactions with an interface, etc.

Sample Interactions and Data Flows

FIGS. 2, 3, 4, 5, 6, 7A, 7B, 7C, 7D, and 8 ("FIGS. 2-8") show example interactions between user devices 102 and a consent management system 100. The interactions and data flows shown in FIGS. 2-8 are illustrative interactions and data flows that may occur during or otherwise in connection with requests for consent, providing or refusing consent, preemptively providing or refusing to provide consent, etc. For example, the interactions and data flows shown in FIGS. 2-8 may be performed in connection with the process 900 shown in FIG. 9.

Figure 2:
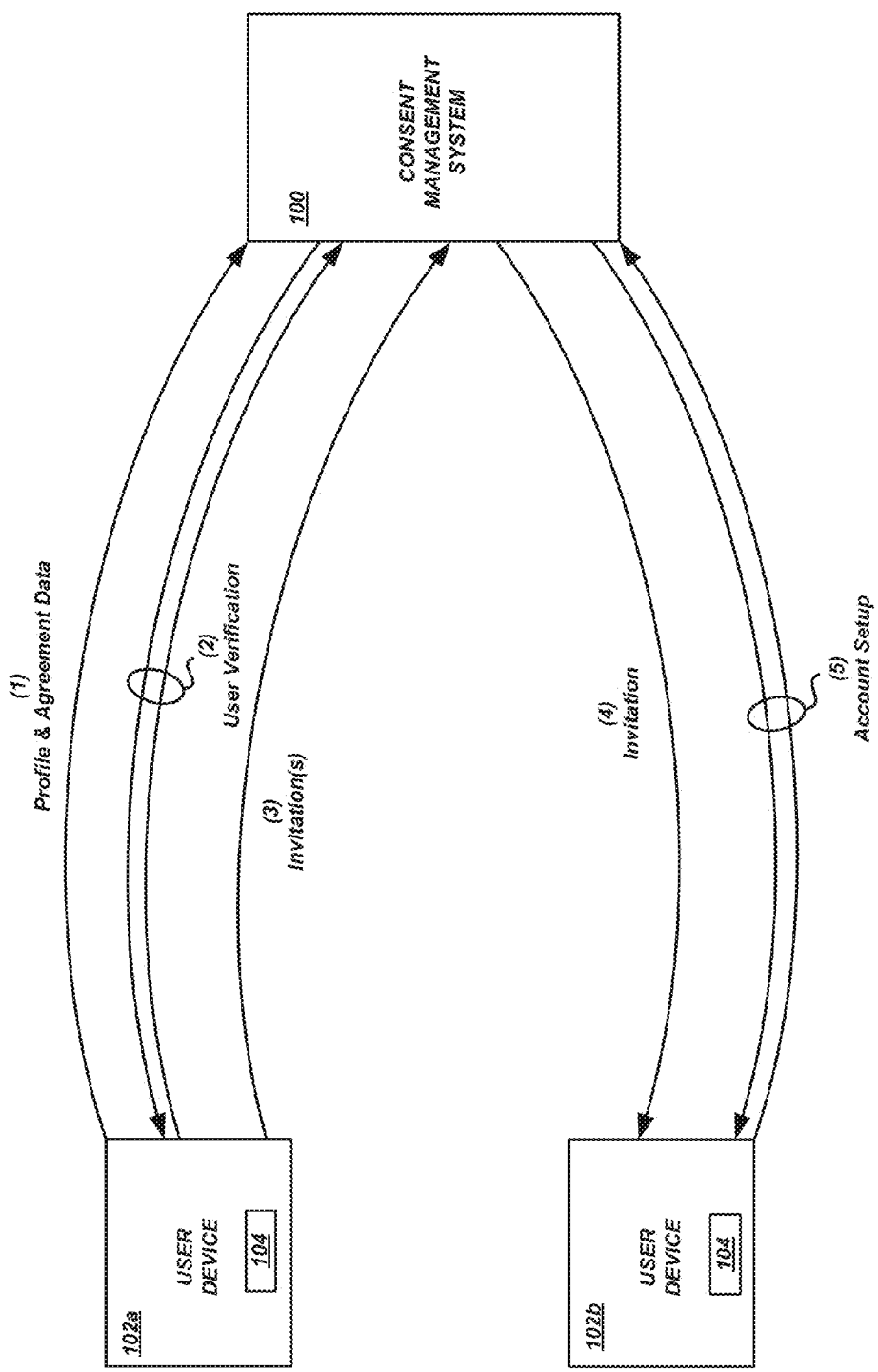
FIG. 2 illustrates example data flows and interactions between user devices and a consent management system to set up accounts with the consent management system according to some embodiments.

With reference to FIG. 2, users may establish accounts or profiles with a consent management system 100 and invite other users to do so. At (1), a user may provide profile data and agree to terms and conditions of use of the consent management system 100 and/or consent application 104. For example, a user may use a user device 102*a* that is executing a consent application 104 to provide demographic information, location information, and/or photographs. The user may also review and agree to terms and conditions of use, such as an agreement to keep information about other users (including consent or refusal to consent) private unless there is a consent-related dispute. The user may also confirm that the user understands the nature of sexual interactions and the implications of consenting thereto.

At (2), the user may provide data to the consent management system 100 that can be used to verify the user's identity in connection with subsequent consent requests, responses, etc. For example, the user may be prompted, by the consent management system 100 via the consent application 104, to set up a password. In some embodiments, the user may provide other verification information instead of or in addition to a password. For example, the user may set up biometric identity verification, such as verification using a fingerprint. The application 104 may cause presentation of an interface on the user device 102*a*, and the user can touch the interface to provide a finger print. The application 104 may then generate a digital representation of the fingerprint. Other examples of verification information include retina scan data, voiceprint data, email, phone calls, etc. For example, a user may call or be called by an automated verification system, and the user may verify his/her identity over the phone in order to request, accept, and/or decline consent.

At (3), the user can invite others individuals to set up an account with the consent management system 100. The user may provide the consent management system 100 with contact information for inviting the other individuals, such as email addresses, telephone numbers, etc. The consent management information may then generate invitations and send them at (4).

At (5), an individual in receipt of an invitation may use a user device 102*b* to obtain (e.g., download) and execute the mobile consent application 104 or access a web site using a browser application. The user may then set up an account with the consent management system 100 as described above.

Turning now to FIG. 3, example interactions and data flows occurring in connection with a consent request will be described. At (1), a user of a first user device 102*a* can select a user from whom consent to engage in a physical relationship is to be requested. The user may search user profiles provided by the consent management system 100, or use known contact information for the other user. Illustratively, a user of a second user device 102*b* may be selected. At (2), a consent request may be sent to the user of the second user device 102*b* via the consent management system 100. The consent management system 100 can relay the consent request to the other user at (3).

At (4) the user of the second user device 102*b* can verify his/her identity to receive or access the consent request. Illustratively, the user of the second user device 102*b* may provide a password, biometric information, and/or other verification information. Once the user's identify is verified (either by the consent application 104 or the consent management system 100), the user may access or be presented with the consent request sent from the user of the first user device 102*a*.

Figure 4C:
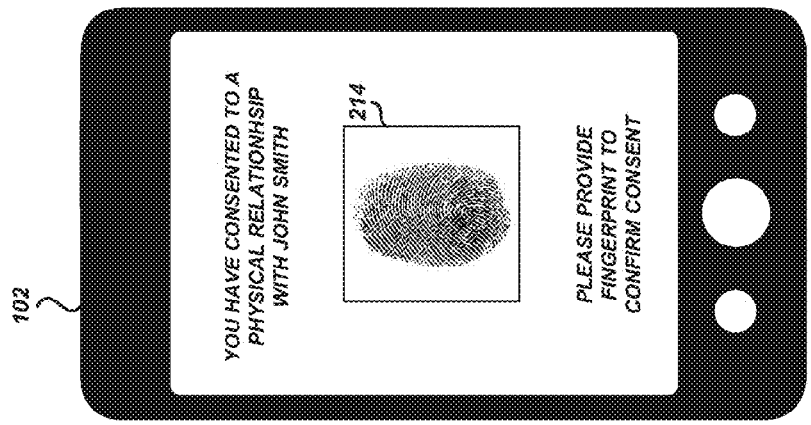
FIGS. 4A, 4B, and 4C illustrate example user interfaces for responding to consent requests and verifying user identity according to some embodiments.
Figure 4B:
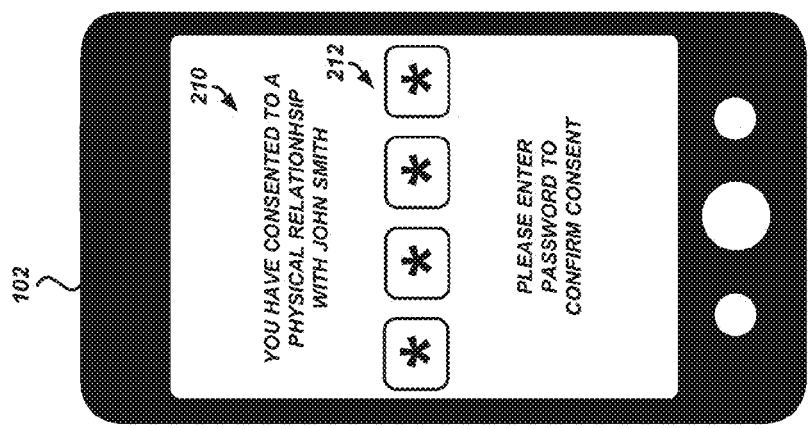
Figure 4A:
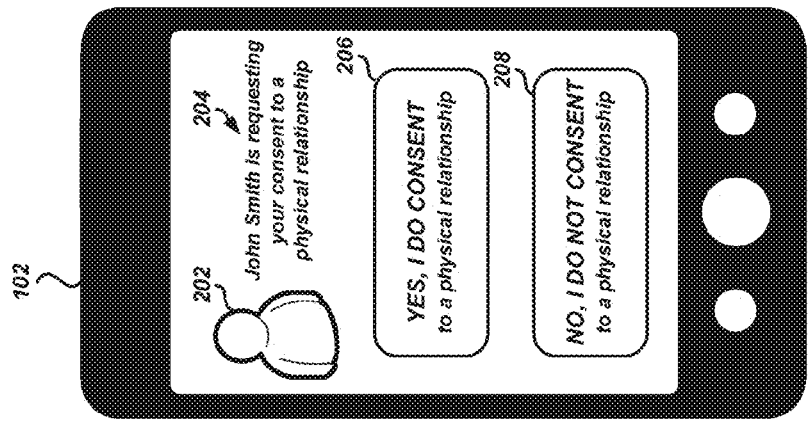

At (5), the user of the second user device 102*b* can consent or decline to consent to the physical relationship requested by the user of the first user device 102*a*. FIGS. 4A, 4B, and 4C show illustrative user interfaces for viewing and responding to consent requests. In some embodiments, as shown, the request may be displayed with a photo, video, avatar, icon, or other visual indicator 202 of the requesting user. A message 204 regarding the request may also be presented. The message 204 may be a standardized message requesting consent to a physical relationship, or the message may be customized (e.g., to include the requesting user's name, to indicate a specific date or time, to indicate specific sexual activities, etc.). In some embodiments, the message may include video and/or audio selected by or recorded by the requesting user.

The user from whom consent is requested may be provided with an option 206 to consent to the requested relationship and an option 208 to refuse consent to the requested relationship. Advantageously, the user may respond to the consent request simply by selecting the desired option and verifying the user's identity. Additional contractual language is not needed because the user has previously reviewed and agreed to such contractual language (e.g., during account set-up as described above). In some embodiments, the responding user may include, with the response, a message to be provided to the requesting user. The message may be textual, or it may include audio and/or video selected by or recorded by the responding user. In other embodiments, the responding user may establish a real-time or substantially real-time communication channel with the requesting user, such as an instant message conversation, a voice chat, a video chat, etc.

The responding user may then be required to verify his/her identity again to confirm the response (or, in some cases, to verify his/her identity for the first time in connection with this request if the user was shown the request without first verifying his/her identity). As shown in FIG. 4B, the responding user may be presented with a user interface that includes confirmation 210 of the user's selection, and a password input area 212 to provide the user verification password described above. In some embodiments, as shown in FIG. 4C, the responding user may be presented with a user interface that includes a biometric input area 214, such as a fingerprint input area. The responding user may then touch the input screen to provide the user's fingerprint. Alternatively, a separate input device may be used to provide the user's fingerprint, such as a dedicated hardware component of the user device 102. As described above, the user may use other forms of biometric verification or other forms of user identity verification altogether.

Returning to FIG. 3, the response to the consent request and user identity verification information may be provided to the consent management system 100 at (6). The consent management system 100 can provide the consent response to the requesting user device 102*a* at (7), and the requesting user device 102*a* can display or otherwise present the response to the requesting user at (8). In some embodiments, as shown, a confirmation that the requesting user has been presented with the response may be provided to the user device 102*b* of the responding user at (9), and eventually presented by the user device 102*b* at (10).

The consent management system 100 can generate and store a record of the consent request and response at (11). The record may indicate which user requested consent, which user responded to the request, what the response was (e.g., agreement or refusal to consent), and the date/time that the request and response were made. A unique record identifier may also be generated. The record may be securely stored by the consent management system 100, such as in the consent records data store 122. In some embodiments, secure storage of the record may include encryption of the record. The encryption may use a general encryption key available to the consent management system 100, or it may use keys associated with one or more users involved in the consent request and response.

Figure 5:
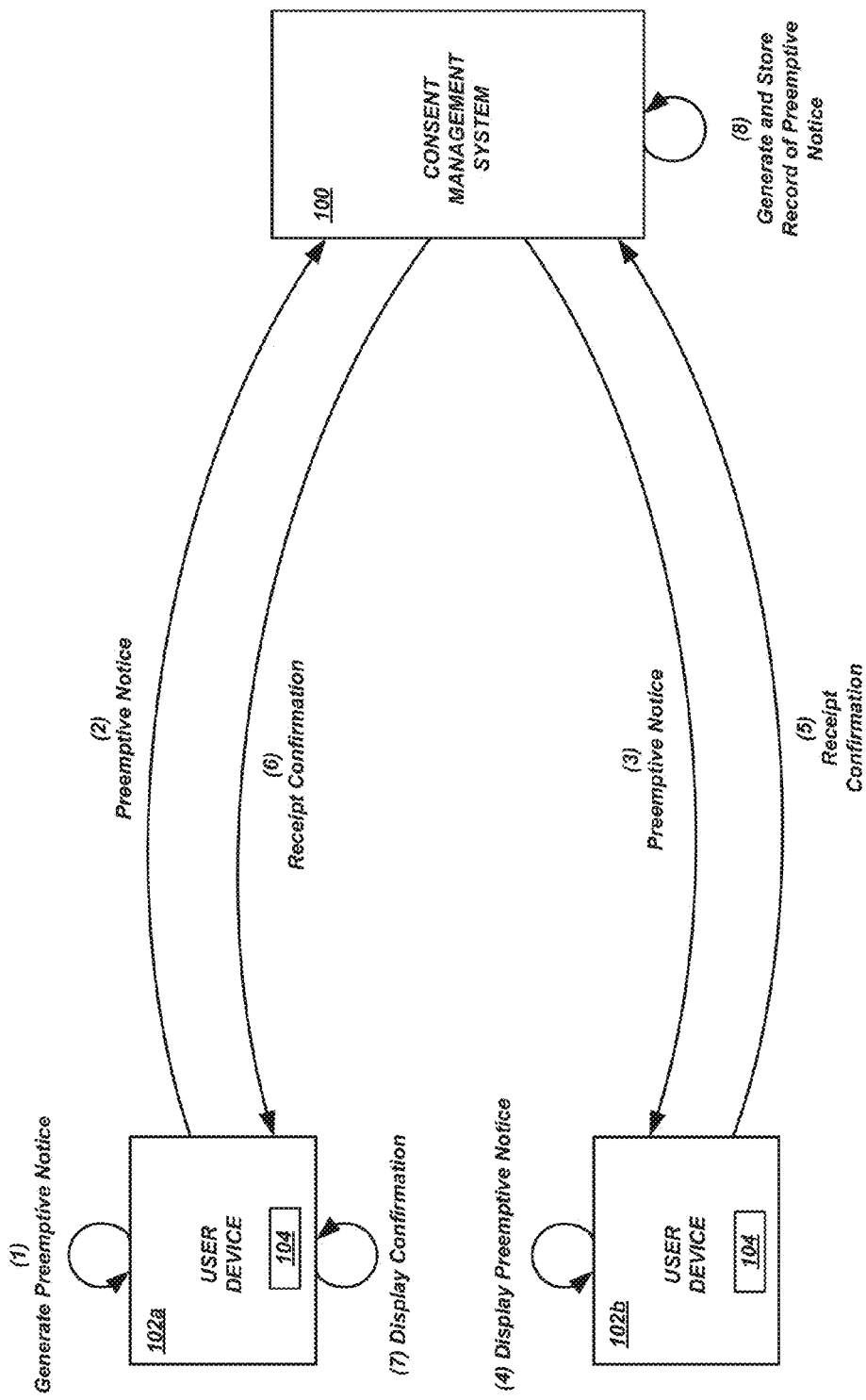
FIG. 5 illustrates example data flows and interactions between user devices and a consent management system to preemptively provide consent notifications according to some embodiments.

With reference to FIG. 5, sample interactions for preemptively providing or refusing consent will be described. Advantageously, a user may provide consent or refuse consent for a physical relationship without first being requested for such consent. For example, a user may preemptively provide or refuse consent before a date in order to manage the expectations of the other party. As shown, a user may generate the preemptive notice at (1). Generation of the preemptive notice may involve selection of another user, such as a user of a second user device 102*b*, as described above with respect to a consent request. However, in the case of a preemptive notification, the initiating user can specify whether or not he/she is consenting to a physical relationship rather than requesting consent for a physical relationship. For example, a user may use an interface similar to the interface shown in FIG. 4A for responding to consent requests. At (2), the preemptive notice can be sent to the second user device 102*b* via the consent management system 100, which can relay the preemptive notice at (3).

At (4), the preemptive notice may be displayed or otherwise presented (e.g., in audio form) by the second user device 102*b*. A confirmation of such presentation may be provided to the first user device 102*b* via the consent management system 100 at (5). The consent management system 100 may relay the confirmation to the first user device 102*a* at (6), which can present the confirmation at (7).

The consent management system 100 can generate and store a record of the preemptive notice at (8). The record may indicate the identity of user that initiated the preemptive notice, the identity of the user to whom the notice was sent, and the date/time that the notice was made. A unique record identifier may also be generated. The record may be securely stored by the consent management system 100, as described above.

Turning now to FIG. 6, additional sample interactions for consenting to a physical relationship will be described. Advantageously, consent may be provided when users are in the same general location and can arrange the relationship in person. In this scenario, the consent management system 100 may be used to memorialize the consent in a secure manner without the inconvenience of reading and signing agreement contracts. As shown, user devices may provide location data to the consent management system 100 at (1). The location data may be provided automatically (e.g., the consent app 104 may monitor GPS coordinates of a corresponding user device 102*b* . . . 0.102*n*, or users may manually provide location data by "checking in" to various locations).

A user of a first user device 102*a* and a user device 102*b* may wish to engage in a physical relationship. Illustratively, the user of the first device 102*a* may obtain information regarding users nearby at (2), including the user of the second user device 102*b*. At (3), the user of the first user device 102*a* may select the user of the second user device 102*b* from a list presented via the consent app 104. The users of the first and second user devices 102*a* and 102*b* may then exchange mutual consent at (4) in a manner that is detected by the consent app 104 and/or the consent management system 100.

FIG. 7A shows an example of a mutual exchange of consent. As shown, the first and second user devices 102*a* and 102*b* may be tapped or otherwise placed in physical proximity. The devices 102*a* and 102*b* may exchange consent information directly (e.g., via near field communication or "NFC," Bluetooth®, Wi-Fi, etc.), and the users may confirm the request by subsequently (or previously) providing user identification information subsequent or prior to the exchange. In some embodiments, the user devices 102*a* and 102*b* do not communicate directly with each other, but instead communicate with the consent management system 100. For example, the devices may provide location information to the consent management system and information indicative of tapping another user device (e.g., as determined based on accelerometer data). The consent management system 100 may determine that the users exchanged consent based on the location information, the prior user selection described above, the information indicative of tapping another device, and timing information reflecting the simultaneous tapping and common location of the two users.

Figure 7B:
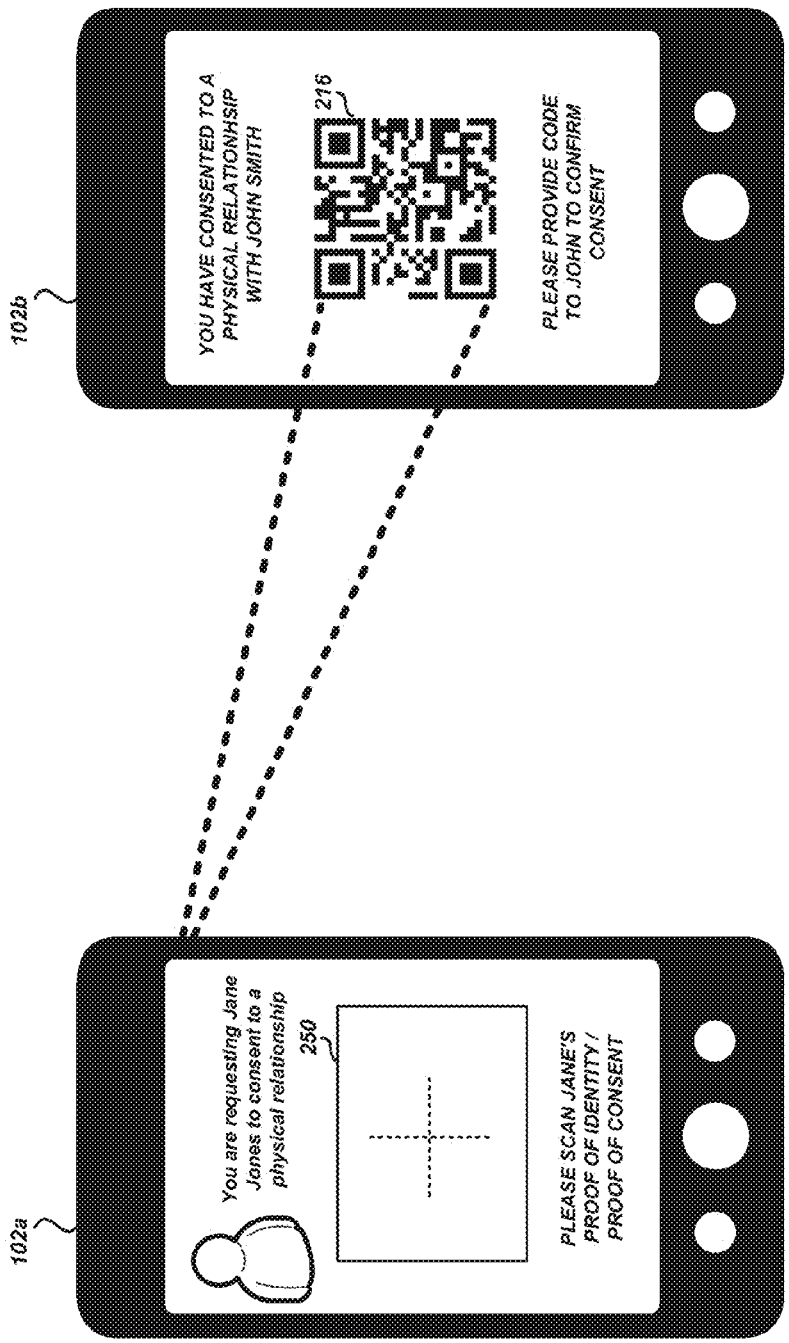
FIG. 7B illustrates an example of a user device scanning identity and/or consent information of another user device according to some embodiments.

FIG. 7B shows another example of using user devices to provide consent. One user device 102b may display encoded information 216 that can be scanned by another user device 102a. The encoded information may include, e.g.: information uniquely identifying a user from whom consent is being requested, or of the user device of that user (e.g., a user identification number or device identification number); information uniquely identifying the user to whom consent is to be granted, or the user device of that user; information uniquely identifying the consent request transaction (e.g., a transaction identification number); information identifying the current date, time, location, etc.; some combination thereof; or some other information to facilitate the secure exchange of consent. In some embodiments, as shown, the encoded information 216 may be a quick response ("QR") code. When a user of first user device 102a requests consent from a user of a second user device 102b (or when the users otherwise agree to memorialize their mutual consent), the second user device 102b may display encoded information 216. The first user device 102a may then scan the encoded information 216 using an optical sensor (e.g., a camera) and a display cue 250. The first user device 102a can verify the encoded information, or send the encoded information (or information derived therefrom) to the consent management system 100 for verification. In some embodiments, the first user device 102a may subsequently or concurrently display encoded information of its own that may be scanned by the second user device 102b and processed in a similar manner. Once the encoded information is obtained and verified by the user device(s) and/or consent management system 100, a consent record can be generated as described herein.

Figure 7C:
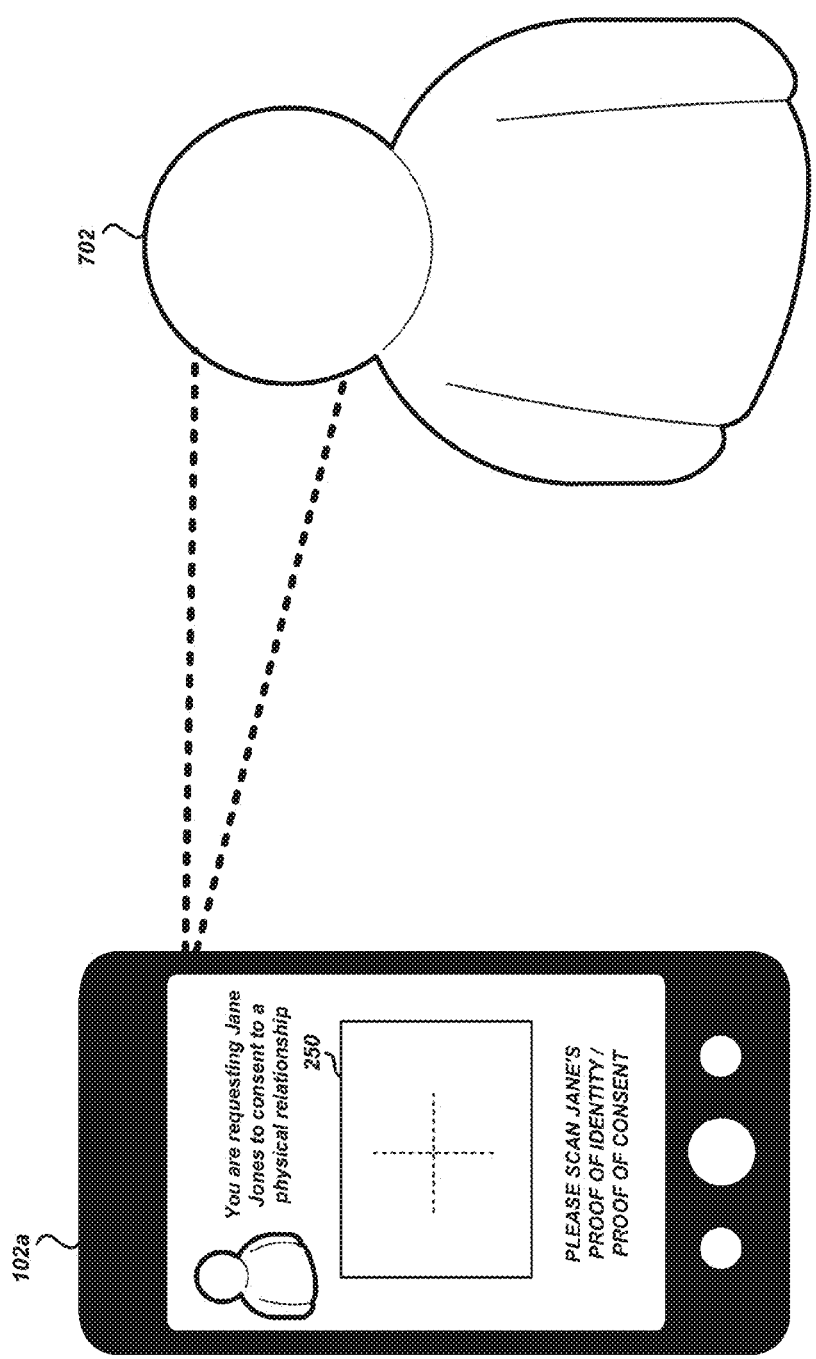
FIG. 7C illustrates an example of a user device scanning identity information of a user according to some embodiments.

FIG. 7C shows an example of user device 102a being used to provide or confirm the consent of a user 702. When a user of first user device 102a receives a request for consent from a user of a second user device (or when the users otherwise agree to memorialize their mutual consent), the user of the first user device 102 may provide consent by, at least in part, proving his/her identity. In some embodiments, the user device 102a may include a sensor to collect data regarding the user 702 in order to verify the user's identity. For example, the user device 102a may include an optical sensor such as a camera or a fingerprint scanner. The sensor can scan the iris, face, fingerprint, or other adequately unique feature of the user 702. Information from the scan can then be used to confirm the user's identity. The first user device 102a can verify the user's identity (e.g., by comparing scan information to profile data stored on the user device 102a and determining whether there is a match to a threshold degree of confidence), or send the scan information or information derived therefrom to the consent management system 100 for verification (e.g., by comparing scan information to profile data stored in the user information data store 120 at the consent management system 100 and determining whether there is a match to a threshold degree of confidence). In some embodiments, a second user device of a second user requesting consent from (or providing consent to) the first user may be similarly used to verify the identity of the second user. In some embodiments, a user device 102a of one user may be used to collect data regarding another user's identity. For example, the user device 102a of one user may be used to scan the identity of another user 702 from whom consent is requested or to whom consent is granted. Once the users' identities (or the identity of a single user) have been verified by the user device(s) and/or consent management system 100, a consent record can be generated as described herein.

Figure 7D:
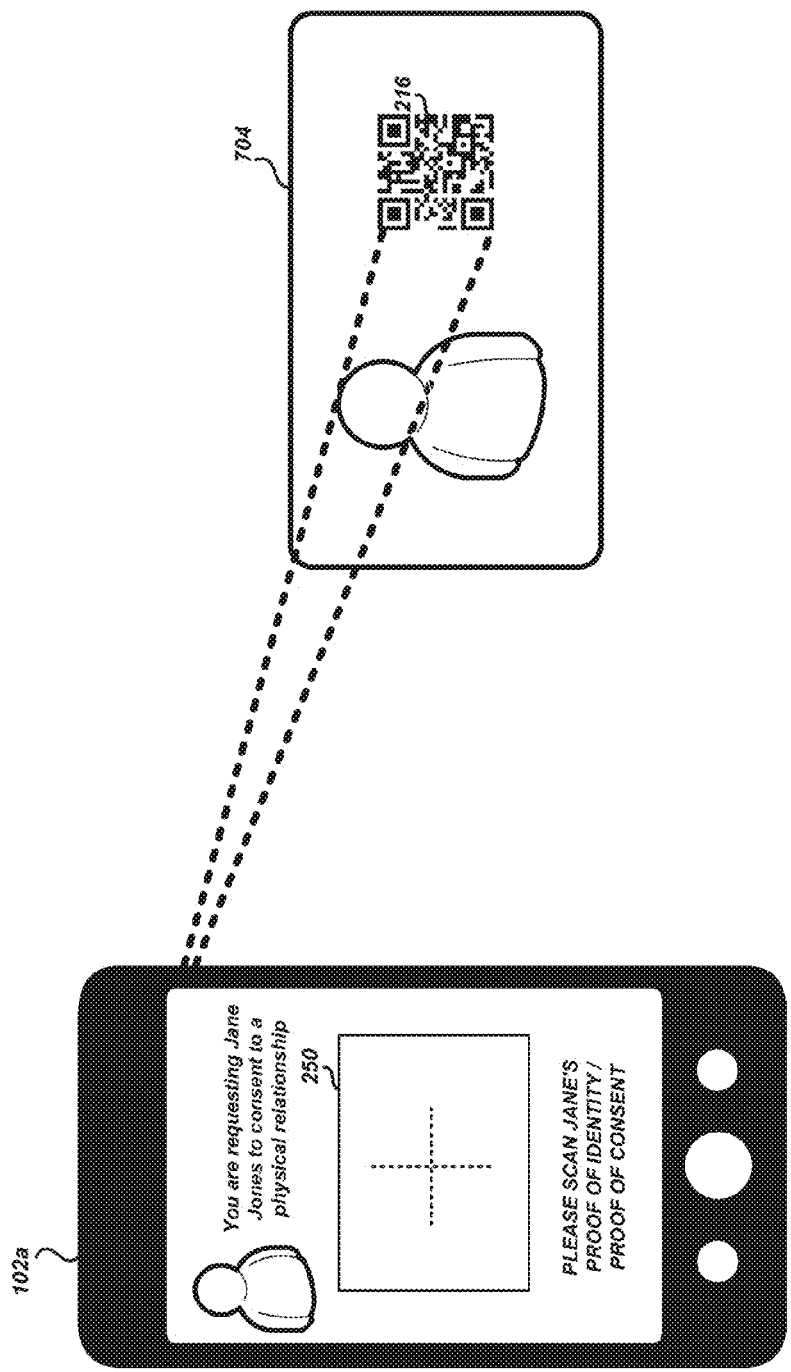
FIG. 7D illustrates an example of a user device scanning identity and/or consent information of a user card according to some embodiments.

FIG. 7D shows another example of user device 102a being used to provide or confirm the consent of a user through the user of an identifying document. When a user of first user device 102a receives a request for consent from a user of a second user device (or when the users otherwise agree to memorialize their mutual consent), the user of the first user device 102 may provide consent by, at least in part, proving his/her identity. In some embodiments, the user device 102a may include a sensor to collect data regarding a user in order to verify the user's identity. For example, the user device 102a may include an optical sensor such as a camera or card scanner. The sensor can scan an identifying document of the user, such as an ID card 704 (e.g., a driver license, government-issued ID card, student ID card, membership card issued by or associated with the consent management system 100, etc.). Information from the scan can then be used to confirm the user's identity. The first user device 102a can verify the user's identity (e.g., by comparing scan information to profile data stored on the user device 102a), or send scan information (or information derived therefrom) to the consent management system 100 for verification. In some embodiments, a second user device of a second user requesting consent from the first user may be similarly used to verify the identity of the second user. In some embodiments, a user device 102a of one user may be used to collect data regarding another user's identity. For example, the user device 102a of one user may be used to scan the identifying document 704 of another user from whom consent is requested or to whom consent is granted. Once the users' identities (or the identity of a single user) have been verified by the user device(s) and/or consent management system 100, a consent record can be generated as described herein.

Returning to FIG. 6, identify verification and consent confirmation information may be provided to the consent management system 100 and relayed to each device at (6) so that the users can verify that the consent was exchanged with the correct user and the consent management system 100 has been notified. At (7) the consent management system 100 may then record information regarding the mutual exchange of consent, as described above with respect to consent requests and responses, and preemptive notifications.

Figure 8:
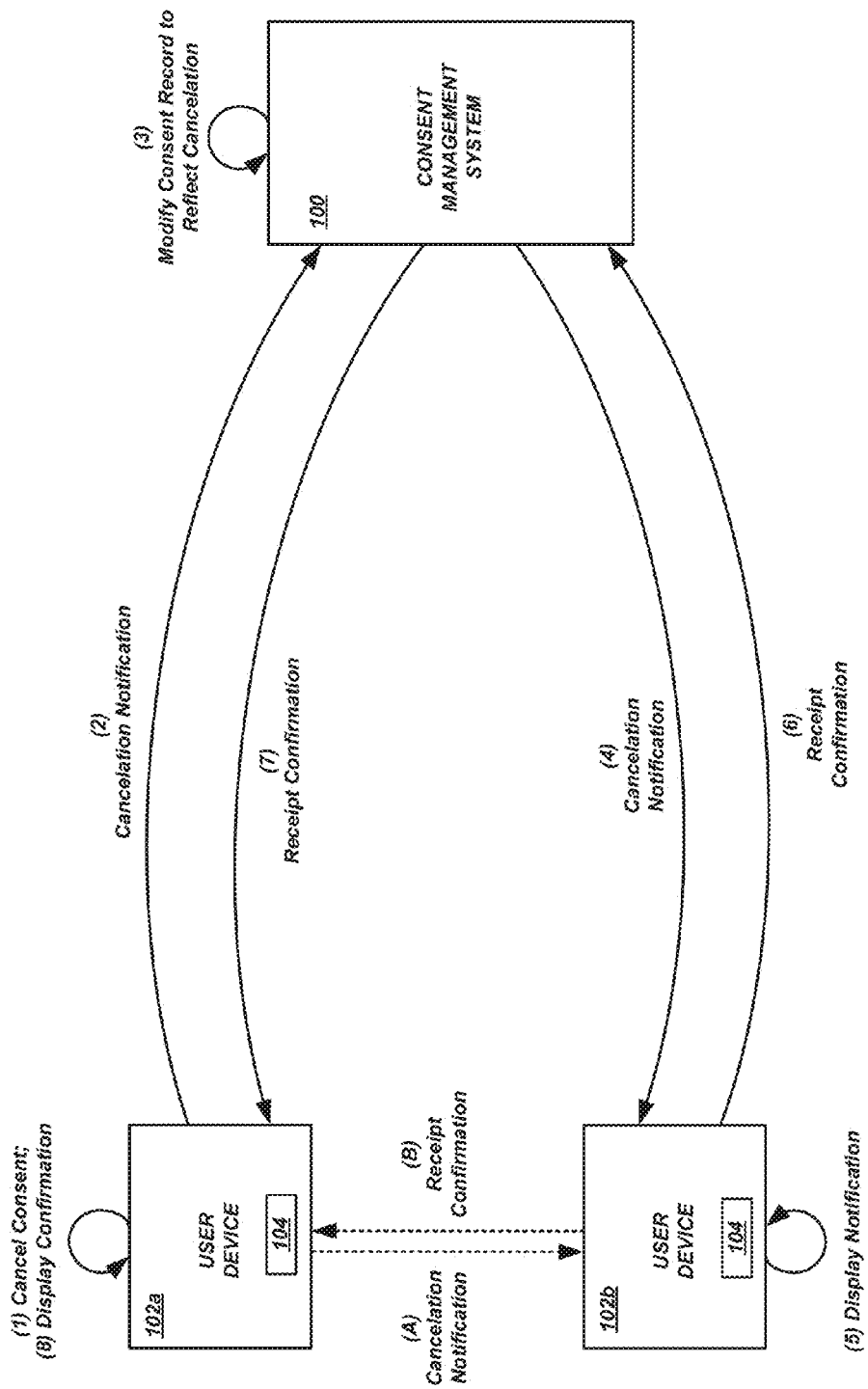
FIG. 8 illustrates example data flows and interactions between user devices and a consent management system to cancel consent according to some embodiments.

Turning now to FIG. 8, example interactions and data flows occurring in connection with cancellation or revocation of a previously-entered consent agreement will be described. At (1), a user of a first user device 102a can select a consent record to be canceled. Illustratively, the consent record may be selected on a user basis (e.g., the user of the user device 102a may search for a user of another device 102b to whom consent was granted), on a consent record basis (e.g., the user of the user device 102a may access a list of records for previously-granted consent), etc. In the present example, a consent record associated with a second user device 102b may be selected.

At (2), a cancellation notification can be generated by the user device 102a. For example, after selection of the consent record to be canceled (or selection of the user from whom consent is to be revoked, etc.), an electronic notification may be transmitted to the consent management system 100. The notification may include an identifier of the consent record to be canceled, an identifier of the user or user device 102*a* canceling the consent record, an identifier of the other user or user device 102*b*, some other information, some combination thereof, etc. The consent management system 100 may modify the appropriate consent record to reflect the cancellation at (3), and send a cancellation notification (the same notification or a different notification) to another user device 102*b* associated with the consent record at (4).

The other user device 102*b* may indicate the cancellation at (5). For example, the other user device 102*b* may present a visual indication, an audible indication, a tactile indication, some other indication, some combination thereof, etc. The user device 102*b* may also send a receipt at (6) indicating the cancellation notification has been received. The receipt may be sent to the consent management system 100, which may optionally record the receipt and/or send the receipt at (7) to the user device 102*a* that canceled the consent record. At (8), the user device 102*a* may indicate receipt of the cancellation by the other user device 102*b*. For example, the user device 102*a* may present a visual indication, an audible indication, a tactile indication, some other indication, some combination thereof, etc.

In some embodiments, as shown, the user device 102*a* canceling the consent record may send a cancellation notification to the other user device 102*b* at (A) without the consent management system 100 acting as an intermediary. The other user device 102*b* may send, to the user device 102*a*, confirmation of receipt of the cancellation notification at (B) without the consent management system 100 acting as an intermediary. In some embodiments, one or both of the user devices 102*a* and 102*b* may transmit information to the consent management system 100 in addition to transmitting information to each other. For example, the user device 102*a* canceling the consent record may send a cancellation notification to the user device 102*b* of the other user, and may also send a cancellation notification comprising the same or different information to the consent management system 100.

Consent Record Generation and Management Process

Figure 9:
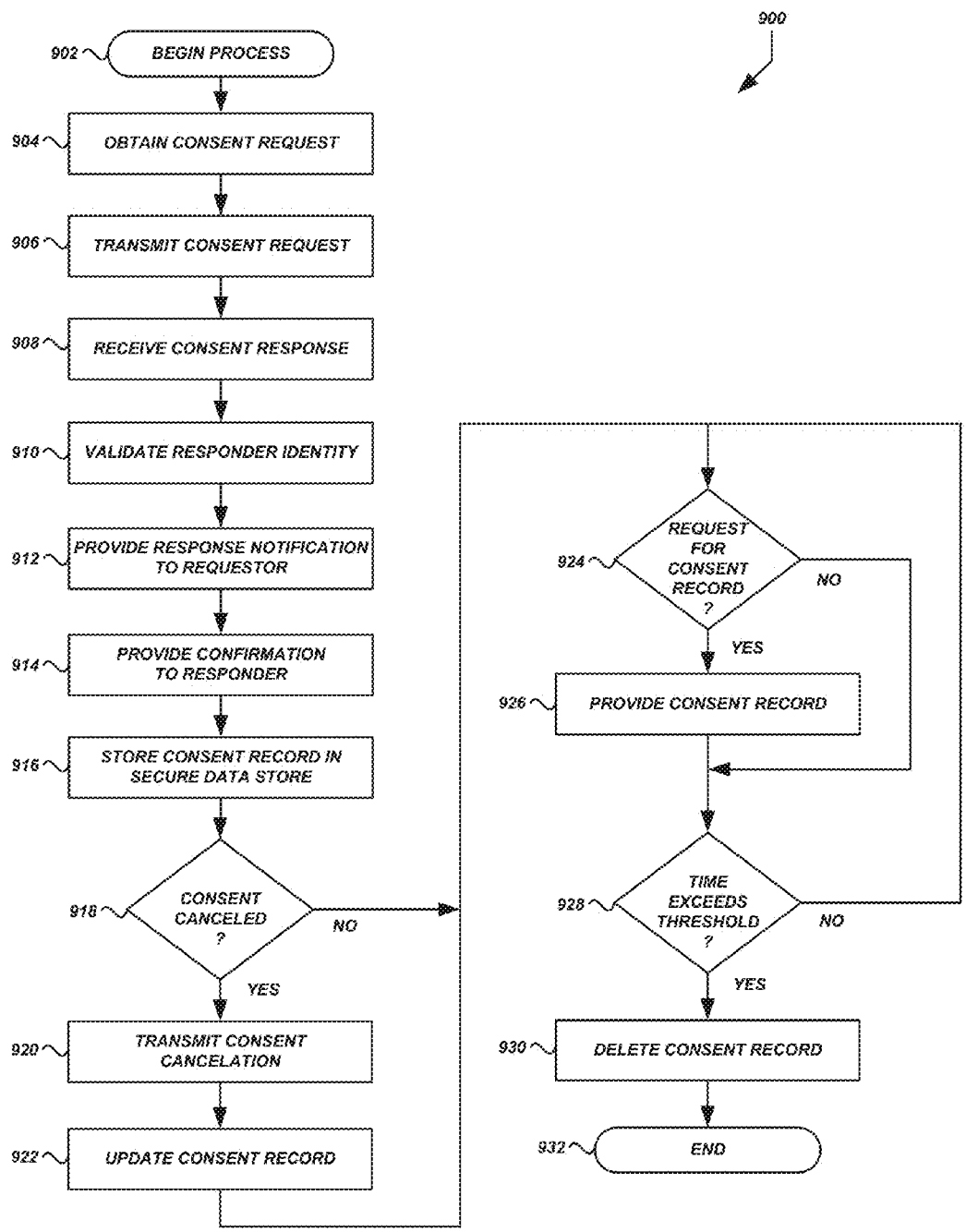
FIG. 9 is a flow diagram of an illustrative process for managing consent requests, generating transaction records, and managing such transaction records according to some embodiments.

FIG. 9 shows an illustrative process 900 for generating consent records and subsequently managing the records, including modifying the records to reflect a cancellation or revocation of consent in some cases. Advantageously, the consent management system 100 can securely store the records for a limited time, and then automatically destroy the records to protect users' privacy.

The process 900 begins at block 902. The process 900 may be embodied in a set of executable program instructions stored on one or more non-transitory computer-readable media, such as one or more disk drives or solid-state memory devices, of a computing system with which the consent management system 100 is associated. When the process 900 is initiated, the executable program instructions can be loaded into memory, such as RAM, and executed by one or more processors of the computing system. In some embodiments, the computing system may include multiple computing devices, such as servers, and the process 900 or portions thereof may be executed by multiple servers, serially or in parallel.

At block 904, the consent management module 112 or some other module or component of the consent management system 100 can obtain a consent request. As described above, the consent request may be obtained from a first user device 102*a*, and may be a request for consent, from a user of a second user device 102*b*, to engage in a physical relationship with the user of the second user device 102*b*.

At block 906, the consent management module 112 or some other module or component of the consent management system 100 can transmit the consent request to the second user device 102*b*. In addition, the consent management module 112 can record information about the request, such as the identity of the requesting user, the identity of the requested user, the date/time at which the request was generated, and the nature of the request (e.g., for consent to engage in a physical relationship in general, for consent to commence a physical relationship on a certain date and/or time, for consent regarding certain sexual interactions, etc.).

At block 908, the consent management module 112 or some other module or component of the consent management system 100 can receive a consent response from the second user device 102*b*. As described above, the response may include selection of a particular option with respect to the request (e.g., provide consent or refuse consent), and the response may include user identity validation information (e.g., password, biometric information, or information derived therefrom, such as a hash).

At block 910, the consent management module 112 or some other module or component of the consent management system 100 can validate the identity of the responding user. For example, the consent management module 112 may compare the password or biometric information (or information derived therefrom, such as a hash) to a stored copy of the password or biometric information (or information derived therefrom, such as a hash).

At block 912, the consent management module 112 or some other module or component of the consent management system 100 can provide a response notification to the requestor. For example, as described above, a notification may be sent the user device 102*a* of the requesting user. In addition, the consent management module 112 can record information about the response, such as the date/time at which the response was generated, and the nature of the response (e.g., whether consent was provided or refused).

At block 914, the consent management module 112 or some other module or component of the consent management system 100 can provide confirmation to the responder that the response was presented to the requesting user.

At block 916, the security module 116 or some other module or component of the consent management system 100 can store a record of the consent request and response in a secure manner. For example, as described above, the security module 116 can encrypt the record and store the record in a consent records data store 122.

At decision block 918, the consent management module 112 or some other module or component of the consent management system 100 can determine whether the grant of consent, managed above, has been canceled. If so, the process 900 can proceed to block 920. Otherwise, if no cancellation of consent is received (e.g., if the date or period of time for which consent was granted has passed), the process 900 can proceed to block 924.

At block 920, the consent management module 112 or some other module or component of the consent management system 100 can determine which user(s) are affected by the cancellation of consent, and can transmit a notification of cancellation to one or more user devices 102 associated with the affected user(s).

At block, 922, the consent management module 112 or some other module or component of the consent management system 100 can update the consent record to reflect the cancellation of consent. For example, the consent record can be modified (or additional record can be added) to include information regarding which user and/or user device canceled the consent, the date and time of cancellation, contextual information regarding the cancellation (e.g., geolocation), and the like.

At decision block 924, the security module 116 or some other module or component of the consent management system 100 can determine whether a request for access to the consent record has been received. If such a request has been received, the process 900 may proceed to block 926; otherwise, the process 900 may proceed to decision block 928.

At block 926, the security module 116 or some other module or component of the consent management system 100 can provide the consent record. For example, if the user is a user associated with the record (e.g., the user is the party requesting consent, responding to a consent request, or generating a preemptive notification), the record may be decrypted and provided to the user (e.g., transmitted to a user device operated by the user), and the user may view, print, or otherwise interact with the record. If the user is not a user associated with the record, access may be denied, or a user associated with the record may be contacted to authorized access.

At decision block 928, the security module 116 or some other module or component of the consent management system 100 can determine whether a period of time that the record has been stored exceeds a threshold, such as about 30 days, about 60 days, about 90 days, about 180 days, or about 1 year. If the period of time exceeds the threshold, the process 900 can proceed to block 930 where the security module 116 deletes the record to preserve the privacy of the users. In some embodiments, some or all of the contents of the record may be deleted, but a log regarding creation of records may be maintained. In this way, the consent management system 100 may provide confirmation that a consent request, response, or preemptive notification was indeed generated at a particular time, but the details may be deleted. If the period of time since creation of the record does not exceed the deletion threshold, the process 900 may return to decision block 924.

Application Programming Interface

Figure 10:
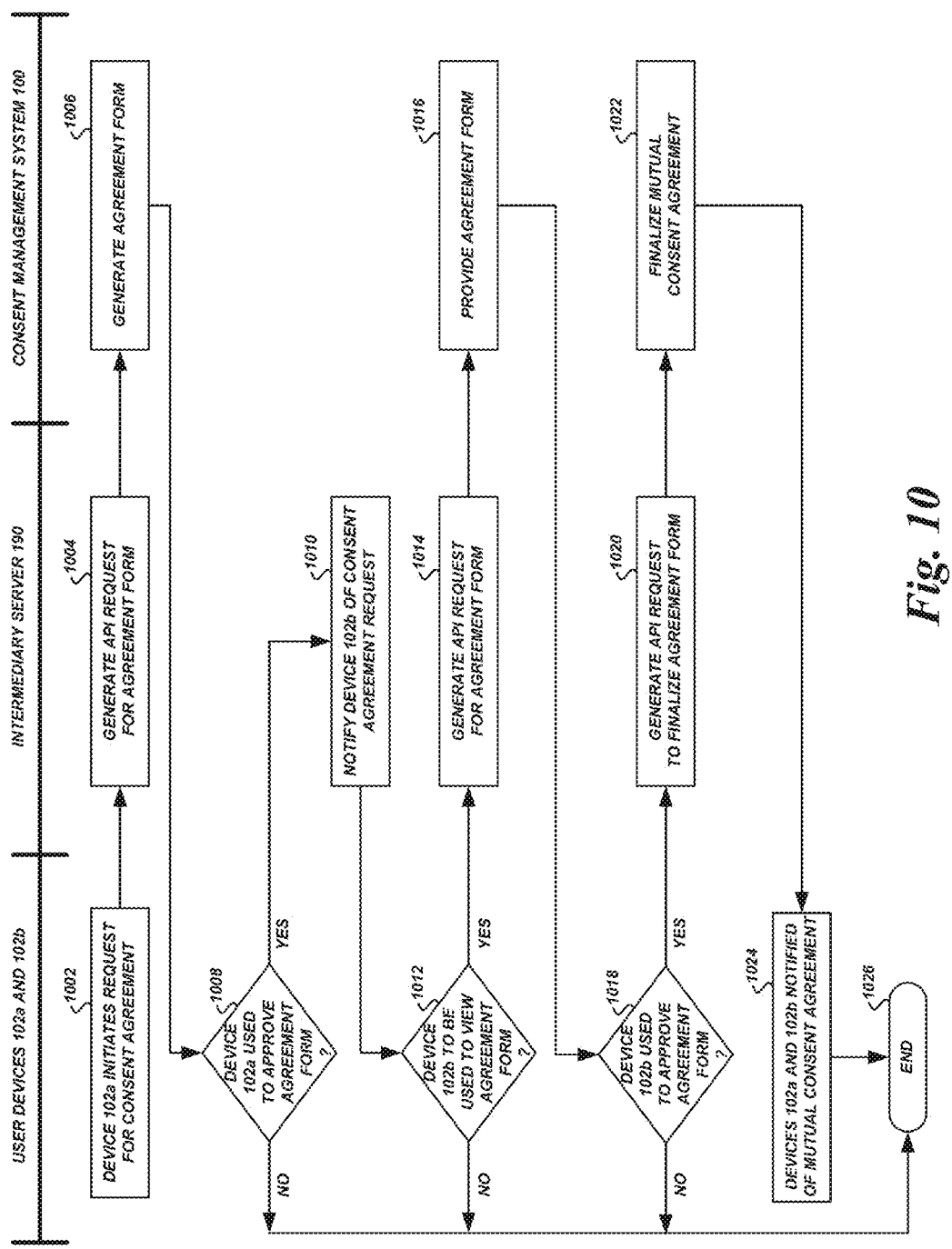
FIG. 10 is a flow diagram of an illustrative process for managing consent requests via an intermediary server using an application programming interface according to some embodiments.

FIG. 10 is a diagram of illustrative data flows and operations that may occur when the consent management system 100 exposes an application programming interface ("API") for use by external systems. In some embodiments, a system may utilize features of the consent management system 100 by interacting with an API exposed by the consent management system 100. For example, a dating system or social network may operate a server to provide dating and/or social networking features. In addition, the server may provide consent management functionality through use of the consent management system API. In this example, the server can be an intermediary or third party with respect to the user devices 102 and consent management system 100. In some embodiments, the API may provide operations with respect to certain objects. For example, the API may operate on user records and consent records. Illustratively, a user record may be represented as a data structure including various data fields, such as a unique user identifier (e.g., user ID), gender, name, email address/phone number/other contact information, an avatar (e.g., a uniform resource locator or URL of an image file), and the like. A consent record may be represented as a data structure including various data fields, such as a unique consent record identifier, a sender or initiator of a request or agreement for consent (e.g., the user ID of the user initiating the request for consent), a receiver of the request or agreement for consent (e.g., the user ID of the user from whom consent is requested), a flag (e.g., yes/no indicator of whether consent has been agreed), a memorialization or certificate (e.g., a URL of a document with the particulars of the consent agreement), a creation data/time, a modification date time, and the like.

Figure 11B:
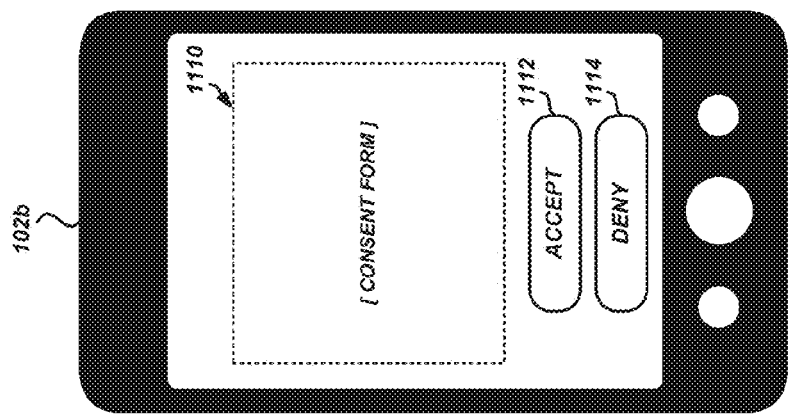
FIGS. 11A and 11B show examples of user interfaces during the consent request and acceptance process according to some embodiments.
Figure 11A:
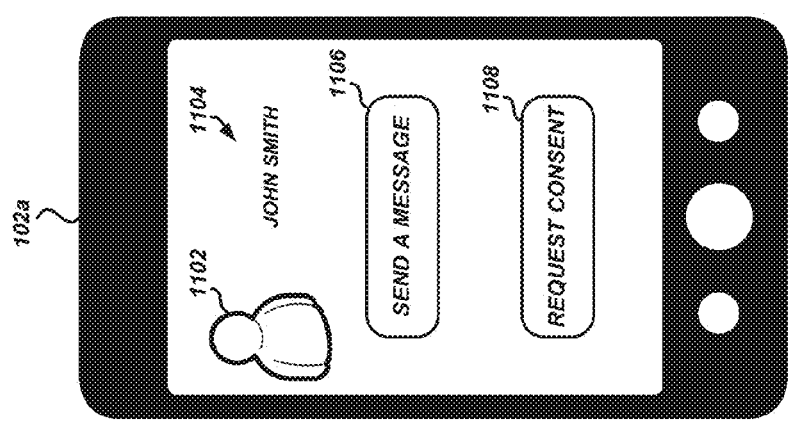

At block 1002, a user of a first user device 102a can initiate a request for a consent agreement while interacting with content received from an intermediary server 190, such as a server operated by a dating system or a social network. FIG. 11A shows an example interface displayed on the user device 102a. The interface may be displaying a profile of another user of the intermediary server 190 (e.g., a contact or potential date). The profile may include a photo 1102, name 1104, other information, some combination thereof, etc. Interactive options of the intermediary server 190 may also be shown, such as an option 1106 to send a message. In addition, an option that corresponds to a function of the consent management system 100 can be presented. Illustratively, the option 1108 may allow a user to request consent from the user whose profile is currently displayed. The option 1108 may be presented using an image or information (e.g., computer code, such as Hypertext Markup Language or "HTML" code) generated by the intermediary server 190. Interactions with the option 1108 may be processed through the intermediary server 190 instead of, or in addition to, being passed directly to the consent management system 100. In some embodiments, the option may be presented using an image or information generated by the consent management system 100. For example, when the intermediary server 190 generates a content page or other user interface for display on a user device 102a, the intermediary server 190 may embed information received from the consent management system 100, or the intermediary server 190 may include a reference to content or information hosted by the consent management system 100.

Returning to FIG. 10, at block 1004 the user of user device 102a has activated the option 1108 to request consent from another user. The user device 102a notifies the intermediary server 190, and the intermediary server 190 generates an API request for a consent agreement form. The API request is to be provided to the consent management system 100. For example, the intermediary server 190 may establish a network connection with the consent management system 100, such as a Hypertext Transfer Protocol ("HTTP") connection separate from an HTTP connection used to communicate with the user device 102a. A request may be transmitted over the connection, such as a transmission including an HTTP header referencing a function of the consent management system 100 and, optionally, including one or more parameters. In some embodiments, the request may be represented by a data structure including various data fields that include the parameter values, including information regarding the user 102a initiating the request (e.g., user ID, name, contact information, other profile information, etc.), information regarding the other user or user device 102b from who consent is to be requested (e.g., user ID), etc.

At block 1006, the consent management system 100 can generate a consent agreement form. The consent agreement form may be an electronic document that is customized for the current request using the parameters provided with the API request (e.g., customized to include the names and/or identifiers of the requesting and requested user). The consent management system 100 may transmit the agreement form directly to the user device 102a, or may provide the form via the intermediary server 190. In some embodiments, the consent management system 100 may generate a response represented by a data structure including various data fields associated with the request, such as user profile information for the sender, user profile information for the receiver, and consent record-specific information such as a flag indicating whether agreement has been reached yet, information regarding terms of the agreement, a reference to a certificate representing the consent agreement, date/time information, etc.

At decision block 1008, the user of the user device 102*a* can determine whether to approve the consent agreement form for transmission to a second user device 102*b* associated with the user from whom consent is sought. If the user approves the form, a transmission may be sent from the user device 102*a* to the intermediary server 190 or consent management system 100. Illustratively, the approval may be represented as a data structure including various data fields, such as an identifier of the relevant consent record (e.g., the consent record associated with a currently approved form), user profile information for the requesting user, user profile information for the receiving user, updated consent record-specific information, etc.

At block 1010, a notification regarding the consent agreement request may be sent to the user device 102*b* of the user from whom consent is sought. The intermediary server 190 may transmit the notification. In some embodiments, the intermediary server 190 may utilize a function exposed by the consent management system API to transmit the notification and handle processing.

At decision block 1012, the user of the user device 102*b*, from whom consent is sought, may determine whether to view the consent agreement form. Illustratively, the user device 102*b* may present a notification that consent is sought. The user may view the notification and transmit a response. The response may correspond to a function of the consent management system 100 exposed by the API. For example, the response may be a request to view the consent agreement form.

At block 1014, the intermediary server 190 can generate an API request for the agreement form. In some embodiments, the API request may be an HTTP request, and may include one or more parameters. The parameters may include an identifier, password, and/or profile information of the user of the user device 102*b* from which consent is sought, an identifier or profile information of the other user or user device 102*a* from whom the consent request was initiated, an identifier of the consent agreement form, etc.

At block 1016, the consent management system 100 can provide the agreement form to the user device 102*b* of the user from who consent is sought. The consent management system 100 may transmit the agreement form directly to the user device 102*b*, or may provide the form via the intermediary server 190.

At decision block 1018, the user of the user device 102*b* may determine whether to approve the consent agreement form and thereby provide the consent sought by the user of the user device 102*a*. If user of user device 102*b* approves the form or otherwise agrees to provide consent, a transmission may be sent to the intermediary server 190 or directly to the consent management system 100. FIG. 11B shows an example interface displayed on the user device 102*b*. The interface may be displaying the consent agreement form 1110. Interactive options of the consent management system 100 may also be shown, such as an option 1112 to accept or approve the consent agreement form, and an option 1114 to reject or deny the consent agreement form. The options 1112 and 1114 may be presented using an image or information generated by the intermediary server 190 or the consent management system 100, as described above with respect to option 1108.

At block 1020, if the approval of the consent agreement form was sent to the intermediary server 190, the intermediary server can generate an API request to finalize the agreement form. In some embodiments, the API request may be an HTTP request, and may include one or more parameters. The parameters may include an identifier or profile information of the user of the user device 102*b* from which consent is sought, an identifier or profile information of the other user or user device 102*a* from whom the consent request was initiated, an identifier of the consent agreement form, etc.

At block 1022, the consent management system 100 can finalize the consent agreement form. The finalized agreement form may be sent to the associated user devices 102*a* and/or 102*b*. The consent management system 100 may or may not store a copy of the finalized agreement form or information regarding finalization of the consent request transaction. For example, the consent management system 100 can store a consent record as described in greater detail above. In some embodiments, the consent management system 100 may transmit notifications to the associated user devices 102*a*, 102*b* indicating finalization of the agreement form.

In some embodiments, rather than the user of the first user device 102*a* approving the consent agreement form, the consent agreement form (or a mere consent request message) may be sent to the second user device 102*b* upon activation of the option 1108 by the user. For example, if a user activates the consent request option 1108, a transmission may be sent to the consent management system 100 directly or through the intermediary server 190, using the API of the consent management system 100 as described herein. The consent management system 100 may then generate a consent agreement form (or a mere consent request message) for transmission, either directly to the second user device 102*b* or first through the intermediary server 190.

In some embodiments, rather than the user of the second user device 102*b* first agreeing or requesting to view the consent agreement form before actually agreeing to provide consent, the consent agreement form (or a mere consent request message) may be sent to the second user device 102*b* without any preliminary notification. The user of the second user device 102*b* may then agree or disagree to provide consent. For example, if the user activates the agreement option 1112, a transmission may be sent to the consent management system 100 directly or through the intermediary server 190, using the API of the consent management system 100 as described herein. The consent management system 100 may then generate or finalize a consent agreement form or record.

Additional Embodiments

In some embodiments, the consent application 104 or consent management system 100 can automatically determine a user's present capacity to provide consent. For example, an intoxication test or other impairment test may be provided to a user in order to determine whether the user may provide consent. The intoxication text may be based on an analysis of breath, saliva, blood, etc., as provided to the mobile device or to some device in communication with the mobile device or the consent management system. As another example, a questionnaire may be presented to the user, or the user may be required to otherwise demonstrate skills that an intoxicated person would be unable to demonstrate.

In some embodiments, a user may call a phone number, such as a toll-free number associated with the consent management system 100, to request consent or respond to consent requests. For example, if a user does not have the consent application 104, access to a browser 108, or otherwise cannot or prefers not to use a computing device to access the features described herein, the user may then call a phone number to access the features telephonically. If such a user is the recipient of a consent request, the consent request may come in the form of a text message or phone call, and the user may respond accordingly.

In some embodiments, users may use cards with information encoded thereon, such as cards with barcodes, magnetic data strips, embedded chips, and the like to request consent and/or respond to consent requests. For example, a card may be used in association with a scanning or swiping device. The scanning or swiping device may retrieve data from the card, such as information regarding the card bearer's identity. Certain functions maybe activated in response to scanning or swiping a card, such as requesting consent, accepting consent, accepting the terms of an agreement, and or verifying identity.

In some embodiments, the consent application 104 and/or consent management system 100 can be used for any agreement or terms and conditions of any agreement. For example, the consent application 104 and/or the consent management system 100 may be used in any situation that includes or requires the requesting of consent, responding to consent requests by accepting the request (e.g., providing consent) or declining the request (e.g., refusing to provide consent), etc.

In some embodiments, the consent application 104 and/or consent management system 100 can be customized for individual groups or networks of users or potential users. For example, a university or other entity may distribute (or authorize for distribution) a version of the consent application 104 to a selected or limited group of users, also referred to as a consent network. Visual aspects of the consent application 104 can be tailored to the group (e.g., school or team colors, logos, etc.). Searching for users and exchanging consent may be limited to users of the customized consent application 104 or members of a defined network. For example, users of a consent application 104 for a particular university, or members of a particular university's network, may be the only users that are allowed to request consent from other users of the university's application or members of the university's network.

In some embodiments, a consent request may be customized by the user sending the request. For example, customized messages, images, visual design elements, and the like may be added to a consent request. As another example, a user may select from a set of pre-defined templates for consent requests, which may or may not be further customized by the user before sending.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability of hardware and software, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a first client-side application;
   a second client-side application; and
   a server comprising one or more hardware processors, wherein the server is programmed by executable instructions to at least:
   receive, from the first client-side application executing on a first computing device, first consent request data regarding a request for consent, wherein the first client-side application is associated with a first user profile, and wherein the request targets a second user profile;
   generate second consent request data regarding the request for consent, the second consent request data generated using data regarding the first user profile and the second user profile;
   determine that the second user profile is associated with the second client-side application;
   transmit the second consent request data via a network to the second client-side application, wherein the second client-side application is executing on a second computing device;
   receive, from the second client-side application, first consent data regarding approval of the consent request;
   receive, from the first client-side application, scan data representing a scan by the first computing device of an encoded representation of information associated with the approval of the consent request displayed by the second computing device; and
   store second consent data regarding approval of the consent request, the first user profile, and the second user profile;
   wherein the first client-side application is configured cause the first computing device to at least:
   transmit the first consent request data to the server;
   generate the scan data representing the scan by the first computing device of the encoded representation of information associated with the approval of the consent request displayed by the second computing device; and
   transmit the scan data to the server; and
   wherein the second client-side application is configured to cause the second computing device to at least:
   receive the second consent request data;
   present a user identity prompt;
   validate a response to the user identity prompt based at least partly on the second user profile;
   generate the encoded representation of the information associated with the approval of the consent request using user identity validation information representing validation of the response to the user identity prompt; and
   display the encoded representation of information associated with the approval of the consent request.

2. The system of claim 1, wherein the server is further programmed by the executable instructions to at least transmit user interface data regarding a visual presentation of an option to initiate the request for consent.

3. The system of claim 2, wherein the executable instructions to transmit the user interface data comprise executable instructions to transmit the user interface data to at least one of: the first computing device or a computing system that serves as an intermediary between the server and the second computing device.

4. The system of claim 1, wherein the server is further programmed by the executable instructions to at least transmit user interface data regarding a visual presentation of an option to approve the request for consent.

5. The system of claim 4, wherein the executable instructions to transmit the user interface data comprise executable instructions to transmit the user interface data to at least one of: the second computing device or a computing system that serves as an intermediary between the server and the second computing device.

6. The system of claim 1, wherein the executable instructions to generate the second consent request data comprise executable instructions to at least generate a consent form comprising information regarding a first user associated with the first user profile and a second user associated with the second user profile.

7. A non-transitory computer readable medium having stored thereon a mobile application comprising executable instructions, wherein the executable instructions are configured to cause a mobile device to at least:
   present a user interface comprising a first option to select a user profile associated with an individual from whom consent to engage in a physical relationship is to be requested;
   generate and transmit a first consent request to a server system, the first consent request comprising information indicating selection of the user profile;

generate scan data representing a scan by the mobile device of a first encoded representation, displayed by a second mobile device, of information associated with an approval of the first consent request;

transmit the scan data to the server system;

present, in response to receipt of a second consent request from the server system, at least a second option to provide consent and a third option to refuse consent;

generate and transmit a consent response comprising at least an indication of selection of the second option and user identity verification information;

generate a second encoded representation of information associated with an approval of the second consent request using the user identity verification information, wherein the user identity verification information represents verification of an identity of a user of the mobile device;

present the second encoded representation of information associated with the approval of the second consent request;

present, subsequent to generating the first consent request or the consent response, at least a fourth option to cancel consent associated with the approval of the second consent request; and generate and transmit a consent cancellation comprising at least an indication of a consent record associated with approval of the second consent request to be canceled.

8. The non-transitory computer readable medium of claim 7, wherein the executable instructions are further configured to cause the mobile device to at least present, subsequent to generating and transmitting the consent cancellation, a notification regarding receipt of consent cancellation data by a third mobile device.

9. The non-transitory computer readable medium of claim 7, wherein the executable instructions are further configured to cause the mobile device to at least present, subsequent to generating and transmitting the first consent request, a notification regarding cancellation of a consent record associated with the first consent request.

10. The non-transitory computer readable medium of claim 7, wherein the user identity verification information comprises at least one of: password information; biometric information; or encoded information scanned by the mobile device.

11. The non-transitory computer readable medium of claim 7, wherein the executable instructions are further configured to cause the mobile device to at least present an option to retrieve a consent record regarding a previously generated content request or a previously generated consent response.

12. The non-transitory computer readable medium of claim 7, wherein the executable instructions are further configured to cause the mobile device to at least present a user interface indication of a consent network to which a user of the mobile device belongs.

13. A computer-implemented method comprising:

as performed by a server computer system comprising one or more hardware processors configured to execute specific computer-executable instructions:

receiving, from a first client-side application executing on a first computing device, first consent request data regarding a request for consent, wherein the first client-side application is associated with a first user profile, and wherein the request targets a second user profile;

generating second consent request data regarding the request for consent, the second consent request data generated using data regarding the first user profile and the second user profile;

determining that the second user profile is associated with a second client-side application;

transmitting the second consent request data via a network to the second client-side application, wherein the second client-side application is executing on a second computing device;

receiving, from the second client-side application, first consent data regarding approval of the consent request;

receiving, from the first client-side application, scan data representing a scan by the first computing device of an encoded representation of information associated with the approval of the consent request displayed by the second computing device; and storing second consent data regarding approval of the consent request, the first user profile, and the second user profile; and as performed by the second client computing device comprising one or more hardware processors configured to execute the second client-side application:

presenting a user identity prompt;

verifying a response to the user identity prompt based at least partly on the second user profile;

generating the encoded representation of the information associated with the approval of the consent request using user identity verification information representing verification of the response to the user identity prompt; and displaying the encoded representation of information associated with the approval of the consent request.

14. The computer-implemented method of claim 13, further comprising transmitting user interface data regarding a visual presentation of an option to initiate the request for consent.

15. The computer-implemented method of claim 14, wherein the transmitting the user interface data comprises transmitting the user interface data to at least one of: the first computing device, or a computing system that serves as an intermediary between the server and the second computing device.

16. The computer-implemented method of claim 13, further comprising transmitting user interface data regarding a visual presentation of an option to approve the request for consent.

17. The computer-implemented method of claim 16 wherein the transmitting the user interface data comprises transmitting the user interface data to at least one of: the second computing device, or a computing system that serves as an intermediary between the server and the second computing device.

18. The computer-implemented method of claim 13, wherein the generating the second consent request data comprises generating a consent form comprising information regarding a first user associated with the first user profile and a second user associated with the second user profile.

* * * * *

UNITED STATES PATENT AND TRADEMARK OFFICE
CERTIFICATE OF CORRECTION

PATENT NO. : 9,934,544 B1
APPLICATION NO. : 15/457822
DATED : April 3, 2018
INVENTOR(S) : Andre Dior Whitfield et al.

Page 1 of 1

It is certified that error appears in the above-identified patent and that said Letters Patent is hereby corrected as shown below:

In the Specification

In Column 10 at Line 42, Change "0.102n," to --102n,--.

In the Claims

In Column 22 at Line 38, In Claim 3, change "device" to --device,--.

In Column 22 at Line 48, In Claim 5, change "device" to --device,--.

Signed and Sealed this
Second Day of July, 2019

Andrei Iancu
*Director of the United States Patent and Trademark Office*